(12) United States Patent
Wiatrowski et al.

(10) Patent No.: US 7,729,701 B2
(45) Date of Patent: Jun. 1, 2010

(54) METHOD AND SYSTEM OF ACCESSING A DE-KEYED BASE STATION

(75) Inventors: David G. Wiatrowski, Woodstock, IL (US); Thomas B. Bohn, Mc Henry, IL (US); Thomas J. Senese, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 529 days.

(21) Appl. No.: 11/191,563

(22) Filed: Jul. 28, 2005

(65) Prior Publication Data

US 2007/0053316 A1    Mar. 8, 2007

(51) Int. Cl.
*H04Q 7/20* (2006.01)
*H04B 7/212* (2006.01)

(52) U.S. Cl. .................... 455/437; 455/457; 455/503; 455/522; 370/321

(58) Field of Classification Search ............... 370/321; 455/437, 457, 503, 522, 502
See application file for complete search history.

(56) References Cited

U.S. PATENT DOCUMENTS

| | | | | |
|---|---|---|---|---|
| 5,678,193 | A | * | 10/1997 | Helm et al. ................. 455/503 |
| 6,091,962 | A | | 7/2000 | Bonta |
| 6,282,430 | B1 | * | 8/2001 | Young ........................ 455/522 |
| 6,337,983 | B1 | * | 1/2002 | Bonta et al. ................. 455/437 |
| 6,366,782 | B1 | * | 4/2002 | Fumarolo et al. ........... 455/457 |
| 6,865,398 | B2 | | 3/2005 | Mangal |
| 2003/0137993 | A1 | | 7/2003 | Odman |
| 2007/0053316 | A1 | * | 3/2007 | Wiatrowski et al. ......... 370/321 |

OTHER PUBLICATIONS

PCT Search Report Dated Sep. 21, 2007.

* cited by examiner

*Primary Examiner*—William D Cumming
(74) *Attorney, Agent, or Firm*—Indira Saladi; Valerie M. Davis

(57) ABSTRACT

A method and system include de-keying a base station in a conventional TDMA communications system and staffing a timer in the base station when the base station de-keys. The method and system further include receiving a transmission from a mobile station and re-keying and repeating the transmission, if the transmission is received with proper synchronization before expiration of the timer.

20 Claims, 3 Drawing Sheets

METHOD AND SYSTEM OF ACCESSING A DE-KEYED BASE STATION

FIELD OF THE INVENTION

The present invention relates generally to wireless communications systems and more specifically to accessing a base station in a conventional time division multiple access (TDMA) communications system.

BACKGROUND OF THE INVENTION

A conventional wireless communications system may generally comprise a set of "mobile stations," typically mobile stations are the endpoints of a communication path, and a set of "base stations," (also known as "repeaters" or "base radios") typically stationary and the intermediaries by which a communication path to a mobile station (MS) may be established or maintained. In such an environment and as is known in the art, the wireless communications system is termed "conventional" to denote the lack of a central controller to manage the communications between the MSs and the base stations. One such type of conventional wireless communications system utilizes time division multiple access (TDMA) to carry the communications of the system over a radio medium (also termed "spectrum") that is divided into time slots and such a system is termed a conventional TDMA communications system.

In a conventional TDMA communications system, each base station (BS) provides synchronization for the MSs, so that the MSs can utilize the spectrum for communication. Once synchronization between the BS and MSs is obtained, each MS can properly receive control signaling that identifies the temporal position of each time slot within the spectrum and the time slot of the spectrum each MS can utilize for communications. Because the spectrum is often shared, the BS normally de-keys when the spectrum is not in use. As is known in the art, de-key (and conjugations of "de-key") means that the BS's transmitter is turned off. Further known in the art, de-keyed means that the BS's downlink is inactive while the BS's uplink remains active and available to detect MS transmissions. When the BS is de-keyed, even though the BS is able to detect transmissions from the MS, the BS may not be able to process the transmissions because the MS may not be in synchronization with the BS. Thus, when the BS is de-keyed, a MS can not utilize the BS for communications until a) the MS sends a wakeup message to the BS which causes the BS to re-key and b) the MS synchronizes to the BS to receive timing information about the BS. After the wakeup and synchronization processes are completed, then a MS may finally utilize the BS for communications.

If the MS believes that the BS is de-keyed (e.g. due to not timely receiving synchronization), then the MS transmits the wakeup message and attempts to synchronize, which takes extra time and thus is undesirable if the MS has to send a wakeup message prior to every transmission. If the MS believes that the BS is keyed (e.g. due to timely receiving synchronization), then the MS does not transmit the wakeup message. In a conventional TDMA communications system, the MS is not explicitly notified that the BS has de-keyed. That is, there is no message that is sent from the BS to the MS that notifies the MS that the BS is about to de-key, de-keying or is de-keyed. In a conventional TDMA communications system, the MS indirectly determines that the BS has de-keyed, such as by not detecting synchronization from the BS. However, there is a finite amount of time that passes before the MS realizes that the BS has de-keyed and during this finite amount of time, if the MS sends communications to the BS, then the communications sent to the BS are ignored by the conventional TDMA communications system since (as mentioned above) the BS requires that the wakeup and synchronization processes be completed before the MS may utilize the de-keyed BS for communications.

Ignoring communications is a problem because the user of the MS does not have knowledge that the communications have not been received by the intended recipient of the communications. For example, if an emergency communication is placed by emergency personnel, as a user of a MS, and the BS is de-keyed, then the emergency personnel is not aware that the emergency communication has not reached its intended recipient, e.g. emergency personnel at a police station. In any case, ignoring communications is a problem.

Accordingly, there is a need for an improved method of accessing a de-keyed base station in a conventional TDMA communications system.

BRIEF DESCRIPTION OF THE FIGURES

The present invention is illustrated by way of example and not limitation in the accompanying figures, in which like references indicate similar elements, and in which.

Figure 1:
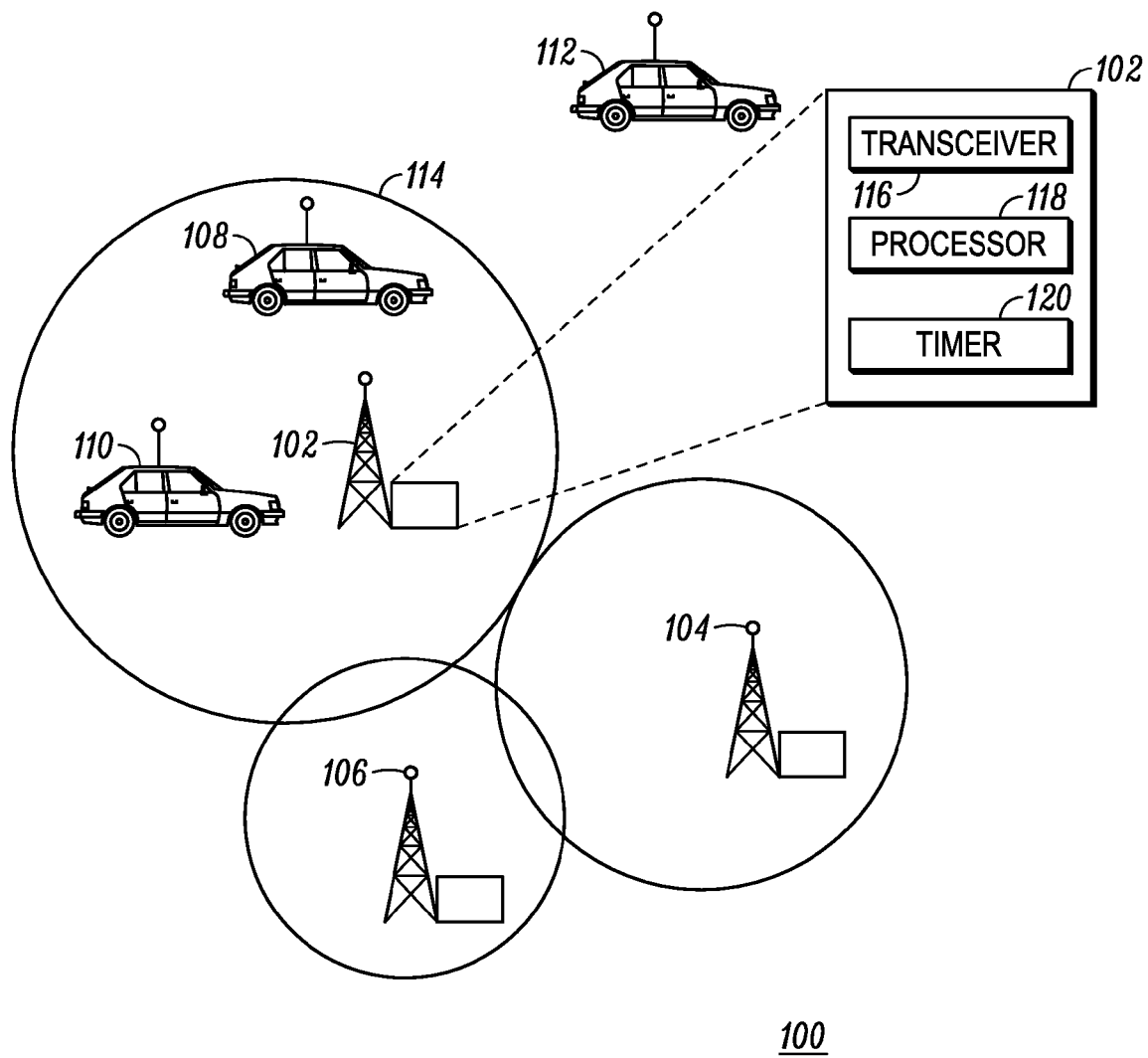
FIG. 1 is a block diagram of an example wireless communications landscape in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments of the present invention, it should be observed that the present invention resides primarily in combinations of method steps and apparatus components. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring now to FIG. 1, there is shown an example of the method and apparatus of the present invention as it may be employed and incorporated into a typical conventional TDMA communications system 100 having a multiplicity of communication RF frequencies (not shown), base stations (BSs) and mobile stations (MSs) whereby the MSs send and receive communications with BSs (also known as "repeaters" or "base radios") and other MSs through intermediary BSs. As mentioned above, the MSs are the endpoints of a communication path. The illustrated system 100 comprises a plurality of cells, each with a BS 102, 104, 106 typically located at the center of the cell (e.g. cell 114), and a plurality of MSs 108, 110, 112 all of which are communicating on RF frequencies (not shown) assigned to the system 100. Each base station comprises (as illustrated by reference to BS 102) a suitable transceiver 116, processor 118, and timers 120 operatively coupled together to perform functions of the base station, including embodiments described herein. In an illustrative embodiment of the present invention, the conventional TDMA communications system 100 assumes a two slot ratio; however, other slotting ratios may be used in the illustrated system 100 and still remain within the spirit and scope of the present invention.

A BS preferably comprises fixed equipment for communicating data/control and voice information to and from the MSs for facilitating communications between the MSs in the wireless communication landscape 100. A mobile station (MS) preferably comprises mobile or portable devices (such as an in-car or handheld radios or radio telephones) capable of communicating with a BS using TDMA techniques as known in the art and not further described herein, in which specified time segments are divided into assigned time slots for individual communication. As is known in the art, each RF frequency in the system carries time slots whereby each time slot is known as a "channel." Thus, for the BSs shown in FIG. 1, each BS has at least one RF frequency where each RF frequency comprises two channels. As is known in the art, each BS comprises at least one RF frequency, termed an uplink (from a MS to a BS) frequency (or an "uplink") and at least one RF frequency, termed a downlink (from a BS to a MS) frequency (or a "downlink"). In any case, if the uplink is one RF frequency, then the uplink comprises two channels, and the similar is true for the downlink.

As is known in the art and as mentioned above, in a conventional TDMA communications system 100, each BS provides synchronization for the MSs, so that the MSs can utilize the spectrum for communication. For example, BS 102 provides synchronization for MSs 108, 110 in the cell 114 that BS 102 serves. Once synchronization between the BS and MSs is obtained, each MS can properly receive control signaling that identifies the temporal position of each time slot within the spectrum and the time slot of the spectrum each MS can utilize for communications. Because the spectrum is often shared, the BS normally de-keys when the spectrum is not in use.

In one embodiment, synchronization occurs by the following process. A MS transmits a wakeup message to a BS, where the wakeup message may be transmitted asynchronously (e.g. without regard to the timing provided by the BS's downlink). As used herein, the wakeup message is used to activate the BS's downlink so that the MS may synchronize itself to the BS. In one embodiment, the wakeup message is termed a "BS Downlink Activation CSBK" and is transmitted by the MS when the MS is not in synchronization with the BS and the MS needs to begin a transmission. In any case, receiving the wakeup message causes the BS to key and transmit messages (termed "hangtime messages").

As used herein, the terms "communication" and "transmission" are used interchangeably and refer to contiguous TDMA bursts emanating from one radio in one timeslot. As such and as used herein, transmissions generically refers to any signal, voice, data or control information that is destined for an endpoint, e.g. a MS.

In operation, a BS, e.g. BS 102, normally de-keys after a certain period of time, e.g. based upon detection of a condition and/or periodically. In one embodiment, the BS de-keys when the BS detects that the MSs do not require repeating functions of the BS. As known in the art, repeating means that the BS receives an inbound transmission on one of the BS's uplink frequencies and transmits the transmission on one of the BS's downlink frequencies where the transmission is destined for another BS or to a MS in the system 100. If the MSs 108, 110 are not using the BS 102 for communications (as used herein, termed "subscriber inactivity"), then after a certain length of time, the BS 102 de-keys. In one embodiment, subscriber inactivity means that no MSs are transmitting on any of the BS's uplink frequencies. In such an embodiment, the BS 102 begins a timer measuring subscriber inactivity. After a pre-defined length of time, e.g. 5 seconds, of subscriber inactivity, the BS de-keys.

In another illustrative embodiment, the BS de-keys periodically after a pre-defined length of time. For example, where the Federal Communications Commission (FCC) requires (as used herein "regulatory requirement") that BSs de-key periodically and specifies a maximum length of continuous time that a BS's transmitter may be operational, the BSs in the system 100 may implement a timer to measure the length of time that the BS's transmitter may be operational before the BS must de-key. In such an embodiment, the BS 102 begins a timer measuring the length of time that the BS's transmitter is operational and after a pre-defined length of time, e.g. 180 seconds, the BS is de-keyed. In one embodiment, the BS implements a timer that tracks the regulatory requirement where the timer expires after 180 seconds.

Even though two cases are described above where a BS in the conventional TDMA system 100 de-keys, an embodiment of the present invention contemplates that there may be many such conditions that trigger a BS being de-keyed. For example, a BS may de-key because a dispatch console operator (e.g. though a wireline connection to the BS), a service technican (e.g. through a front panel switch on the BS), or a MS operator (e.g. through the BS uplink frequency) has invoked a BS "up/down" function (as known in the art and not further described herein) on the BS. For example, a BS may de-key because the BS detects a hardware or software failure that indicates the BS should de-key. For example, a BS may de-key because the BS receives a repeat disable indication from co-channel equipment, indicating that the co-channel equipment is requesting to use the channel and the BS should yield use of the channel. For example, a BS may de-key because it fails to detect valid MS synchronization signals on the BS uplink due to Raleigh fading or a large amount of channel errors (also known as bit errors) due to weak signal reception. For example, a BS may de-key because it detects an invalid MS signal on the BS uplink frequency (e.g., incorrect color code). In any case, the conditions that cause a BS to de-key may be many.

Figure 2:
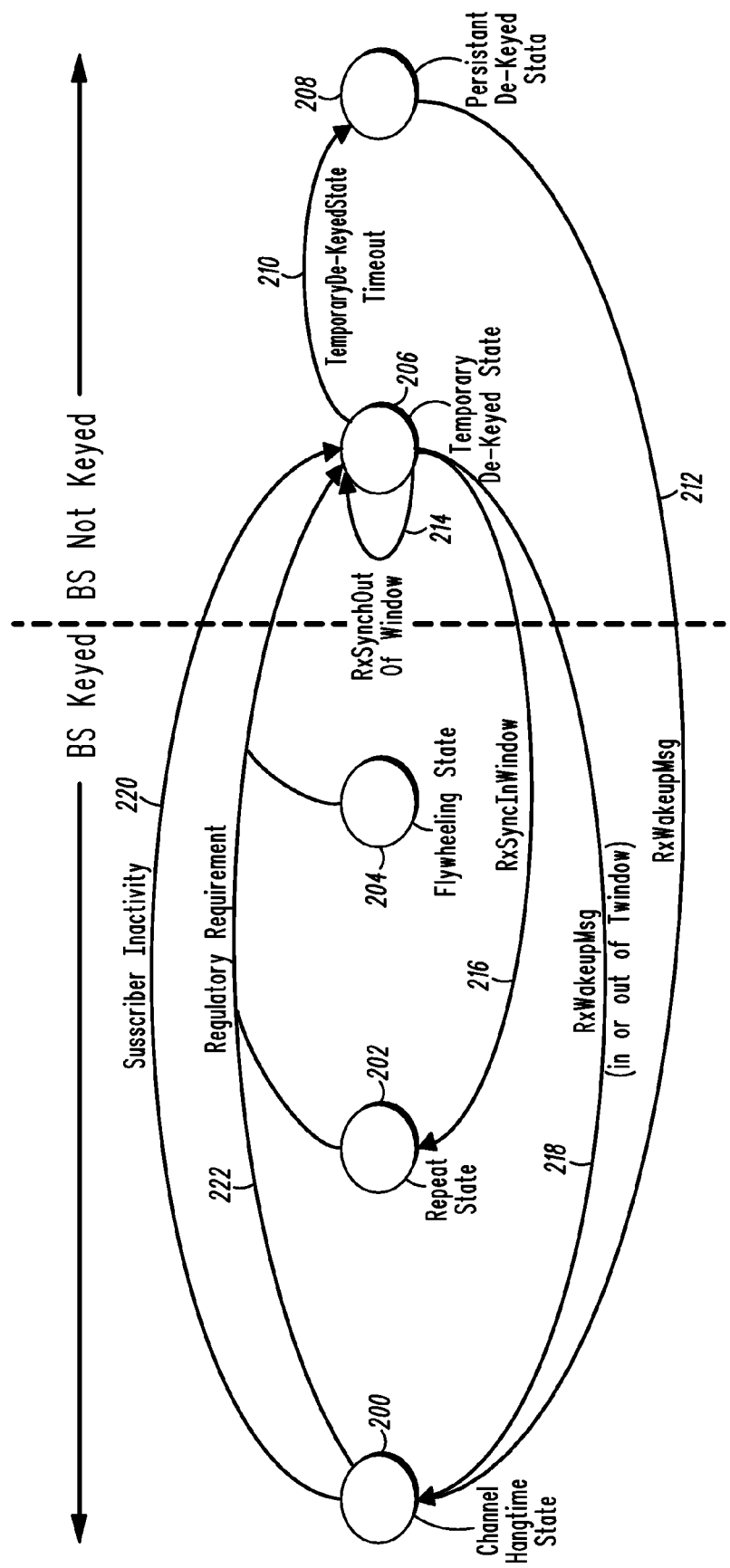
FIG. 2 is a state transition diagram in accordance with an embodiment of the invention.

Referring to FIG. 2, at the highest level, an embodiment of the present invention involves implementing a temporary de-keyed state 206 and a persistent de-keyed state 208 so that communications that are properly received while in the temporary de-keyed state 206 cause re-keying and repeating. Further, an embodiment of the present invention delays the time that a BS enters the persistent de-keyed state 208 so that MSs associated with the BS detect that the BS has de-keyed before the BS enters the persistent de-keyed state 208. If after a certain period of time (e.g. Transition 220 where there is subscriber inactivity or Transition 222 where there is a regulatory requirement), the BS de-keys, then there is another period of time that the BS remains able to process communications from a MS before the BS enters the persistent de-keyed state 208. During this second period of time, the BS may receive communications and re-key the BS downlink and repeat those communications if the communications are received with proper synchronization (RxSyncInWindow Transition 216). As such, an embodiment of the present invention improves the efficiency and reliability of a conventional TDMA communications system, e.g. system 100, by not requiring the MS to transmit a wakeup message and resynchronize to the BS downlink before beginning its transmission.

Referring to FIG. 2, in operation, a BS keys up and begins transmitting channel hangtime messages (also termed idle messages) to the MSs in the cell 114. In one embodiment, the channel hangtime messages are transmitted to allow the MSs to synchronize to the BS, in addition to notifying the MSs that the BS is awake. In this state 200 (also termed channel hangtime state 200), where the BS is transmitting channel hangtime messages, the BS is not repeating any communications on the uplink. That is, there are no communications from any of the MSs that need to be repeated by the BS to either another BS or another MS in the system 100. If while waiting for a communication, the BS's subscriber inactivity timer expires (Transition 220), then the BS de-keys and enters the temporary de-keyed state 206.

Further, regardless of the keyed state that the BS is in, e.g. 200, 202, 204, if the BS's regulatory requirement timer expires (Transition 222), then the BS de-keys and enters the temporary de-keyed state 206. When the BS enters the temporary de-keyed state 206, it begins a temporary de-keyed state timer where the temporary de-keyed state timer has a length equal to the time that the BS is in the temporary de-keyed state.

If while in the temporary de-keyed state 206, the BS receives a transmission from a MS with proper synchronization before the expiration of the temporary de-keyed state timer (RxSyncInWindow, Transition 216), then the BS re-keys automatically and repeats the transmission (State 202). If while in the temporary de-keyed state 206, the BS receives a transmission from a MS that is not in synchronization (RxSyncOutOfWindow, Transition 214) before the expiration of the temporary de-keyed state timer, then the BS ignores the transmission and remains in the temporary de-keyed state 206, where a transmission is defined as destined for an endpoint in the system 100 (as mentioned above). As used herein, the temporary de-keyed state timer may be pre-defined and/or configurable. In any event, the temporary de-keyed state timer is set to a maximum time that it takes for the MSs in the cell to determine that the BS has de-keyed.

Figure 3:
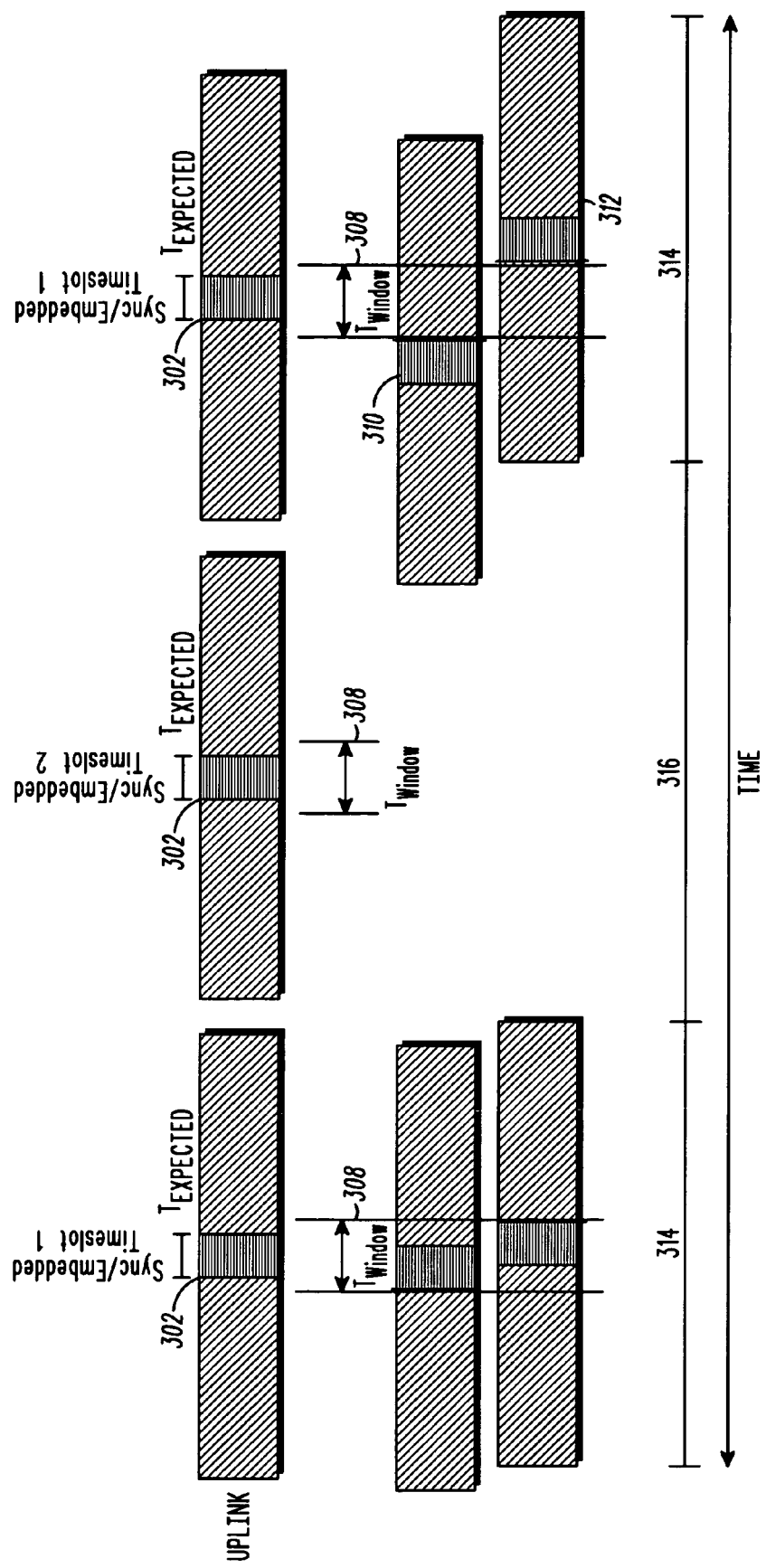
FIG. 3 is a timing diagram in accordance with an embodiment of the invention.

As used herein, proper synchronization means that the transmission is received within timing boundaries, also known as a window. Referring to FIG. 3, shown is a timeline 300 for the uplink of a BS. The timeline 300 shows two timeslots 314, 316 and windows of time (namely $T_{EXPECTED}$) 302 that the BS expects to receive transmissions from the MS. In one embodiment, $T_{EXPECTED}$ is approximately 5 milliseconds. To compensate for delays in transmission, signal propagation delays between the MS and BS, and reference oscillator variability between the BS and the MS, the BS allows for transmissions to arrive earlier and later than the window 302 of $T_{EXPECTED}$. In one embodiment, $T_{EXPECTED}$ is approximately 7.083 milliseconds. Also, in one embodiment, proper synchronization means that the transmission is received within the window 308 of time termed $T_{WINDOW}$. In any event, if transmissions are received outside the window 308 $T_{WINDOW}$, then the transmission is not received with proper synchronization and will not be processed (RxSyncOutOfWindow, Transition 214). For example, a transmission 310 that is received too early is not processed and a transmission 312 that is received too late is not processed where early and late means that the transmission is received outside the window 308 $T_{WINDOW}$. The assumption is that the MS was not in synchronization with the BS before the BS de-keyed, so the BS does not need to process the transmission because the MS was not properly associated with the MS so the MS does not need to re-key to process a transmission from an MS that is not properly associated with the BS.

If while the BS is in the temporary de-keyed state 206, the BS receives a wakeup message (RxWakeupMsg, Transition 218), the BS re-keys and begins transmitting channel hangtime messages 200. In one embodiment, whether the wakeup message is received with proper synchronization or not, the BS re-keys and enters the channel hangtime state 200. As mentioned above, the BS transmits channel hangtime messages in the channel hangtime state 200 that allows the MS to synchronize to the BS. In one embodiment, the channel hangtime messages are idle messages.

In one embodiment, determining that the BS has de-keyed is performed by starting a timer in the MS and searching for synchronization during that time. If no synchronization is received for a specified time (e.g. 720 msec), then the MS determines that the BS has de-keyed. In one embodiment, the temporary de-keyed state timer is set to be 720 msec because 720 msec is the length of time that it takes a MS to determine that the BS has de-keyed. As is known in the art, not receiving synchronization for a period of time but continuing to process received signals as if the synchronization had been received throughout that period of time (also known as the "flywheeling time") is termed "flywheeling" and the time that either the MS or the BS can "flywheel" is set to a predefined length of time. In one embodiment (and as mentioned above), the "flywheeling" time is 720 msec and the temporary de-keyed state timer reflects the longest "flywheeling" time of any MS in the system 100.

At the expiration of the temporary de-keyed state timer (TemporaryDe-KeyedStateTimeout, Transition 210), the BS enters the persistent de-keyed state 208. When the BS is in the persistent de-keyed state 208, the relationship between the BS and the MS needs to be reestablished before the BS can repeat transmissions received from the MS. The relationship between the BS and the MS is reestablished by the BS receiving a wakeup message from the MS. In one embodiment, the BS must enter the persistent de-keyed state because of regulatory requirements where those regulatory requirements are placed so that the spectrum is efficiently shared with co-channel users, e.g. the system 100 sharing frequencies with another system (not shown). As mentioned above, when the BS receives a wakeup message (RxWakeupMsg, Transition 212), it re-keys and begins transmitting channel hangtime messages.

In simplest terms, in an embodiment of the present invention, the purpose of the temporary de-keyed state 206 is to accommodate the time that it takes the MS to detect that the BS has de-keyed. By having the temporary de-keyed state 206, properly received transmissions from a MS that occur while the BS is in the temporary de-keyed state 206 are processed and repeated by the BS and not ignored or discarded by the system 100. Thus, the conventional TDMA communications system 100 efficiency and reliability are enhanced.

It will be appreciated that embodiments of the present invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as steps of a method. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. In a conventional TDMA communications system, wherein the conventional TDMA communications system comprises at least one base station and at least one mobile station, a method of accessing a de-keyed base station comprising:
   de-keying a base station in the conventional TDMA communications system;
   starting a timer in the base station when the base station de-keys;
   receiving a transmission from a mobile station; and
   re-keying and repeating the transmission, if the transmission is received with proper synchronization before expiration of the timer.

2. The method of claim 1 wherein proper synchronization comprises receiving the transmission within timing boundaries.

3. The method of claim 1 wherein the de-keying occurs after a period of time.

4. The method of claim 3 wherein the period of time is based upon at least one of a) detection of a condition and b) periodically.

5. The method of claim 4 wherein the de-keying occurs based upon at least one of a) detection of subscriber inactivity and b) a regulatory requirement.

6. The method of claim 1 wherein the timer has a length equal to a maximum time that it takes for mobile stations in the conventional TDMA communications system to determine that the base station has de-keyed.

7. The method of claim 6 wherein the time that it takes for each mobile station in the conventional TDMA communications system to determine that the base station has de-keyed is performed by the mobile station starting a timer, searching for synchronization during that time, and if no synchronization is received then determining that the base station has de-keyed.

8. The method of claim 1 further comprising ignoring the transmission, if the transmission is received without proper synchronization before expiration of the timer.

9. The method of claim 1 further comprising re-keying and sending channel hangtime messages, if a wakeup message is received before expiration of the timer.

10. The method of claim 9 wherein the wakeup message is not received with proper synchronization.

11. The method of claim 1 further comprising requiring a wakeup message from the mobile station before re-keying the base station at expiration of the timer.

12. The method of claim 1 wherein the step of re-keying and repeating is performed without the base station receiving a wakeup message from the mobile station.

13. In a conventional TDMA communications system, wherein the conventional TDMA communications system comprises at least one base station and at least one mobile station, a method of accessing a de-keyed base station comprising:
   at a base station in the conventional TDMA communications system:
      entering a temporary de-keyed state;
      remaining in the temporary de-keyed state for a period of time;
      receiving a transmission from a mobile station while in the temporary de-keyed state; and
      entering a repeat state, if the transmission is received with proper synchronization while in the temporary de-keyed state.

14. The method of claim 13 further comprising entering a persistent de-keyed state after the period of time.

15. The method of claim 13 wherein the step of entering the temporary de-keyed state is based upon at least one of a) detection of subscriber inactivity b) a regulatory requirement.

16. The method of claim 13 wherein the period of time has a length equal to a longest flywheeling time of any mobile station in the system.

17. The method of claim 13 wherein proper synchronization comprises receiving the transmission within a window $T_{WINDOW}$.

18. The method of claim 13 further comprising entering a channel hangtime state after receiving a wakeup message from the mobile station.

19. In a de-keyed base station of a conventional TDMA communications system, a system of accessing the de-keyed base station comprising:
   a timer to measure the length of time in a temporary de-keyed state, wherein the timer comprises a flywheeling time of a mobile station in the conventional TDMA communications system;
   a receiver which receives a transmission from the mobile station; and
   means for re-keying and repeating the transmission, if the transmission is received with proper synchronization before expiration of the timer,
   wherein proper synchronization comprises receiving the transmission within a window of time $T_{WINDOW}$.

20. The system of claim 19 further comprising means for entering a persistent de-keyed state upon expiration of the timer.

* * * * *